(12) United States Patent
Ptasinski et al.

(10) Patent No.: US 8,530,885 B1
(45) Date of Patent: Sep. 10, 2013

(54) GRAPHENE-BASED CONDUCTIVE, LOSSLESS PHOTONIC BANDGAP METHOD AND APPARATUS

(75) Inventors: Joanna N. Ptasinski, San Diego, CA (US); Stephen D. Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/485,553

(22) Filed: May 31, 2012

Related U.S. Application Data

(63) Continuation-in-part of application No. 12/715,241, filed on Mar. 1, 2010, now Pat. No. 8,217,382, which is a continuation-in-part of application No. 12/464,769, filed on May 12, 2009, now abandoned.

(51) Int. Cl.
*H01L 29/06* (2006.01)
(52) U.S. Cl.
USPC .............................. 257/21; 257/22; 257/184
(58) Field of Classification Search
USPC ............................................. 257/21, 22, 184
See application file for complete search history.

(56) References Cited

U.S. PATENT DOCUMENTS

| 6,274,293 | B1 | 8/2001 | Gupta et al. |
| 7,194,175 | B1 | 3/2007 | Rodgers et al. |
| 7,274,413 | B1 | 9/2007 | Sullivan et al. |
| 7,315,675 | B2 | 1/2008 | Harrington et al. |
| 2012/0125429 | A1* | 5/2012 | Myong ..................... 136/256 |

OTHER PUBLICATIONS

Berman, Oleg L. and Kezerashvili, Roman Y., "Graphene-based One-dimensional Photonic Crystal", Journal of Physics Condensed Matter, Dec. 8, 2011, vol. 24, IOP Publishing, pp. 1-7.

* cited by examiner

*Primary Examiner* — Long Pham
(74) *Attorney, Agent, or Firm* — Ryan J. Friedl; Kyle Eppele

(57) ABSTRACT

A system includes a substrate having a plurality of three-dimensional photonic crystal elements directly coupled thereto. The photonic crystal elements may each partially or substantially coated with oriented graphene and may comprise undoped silicon. The graphene may be oriented in a direction parallel to or normal to the photonic crystal element and may comprise graphene flakes contained within a composite thin film. The system may also include at least one optical component, such as a waveguide, contained within the plurality of three-dimensional photonic crystal elements. A method is also provided for preparing the graphene and coating the photonic crystal elements with the graphene.

14 Claims, 4 Drawing Sheets

GRAPHENE-BASED CONDUCTIVE, LOSSLESS PHOTONIC BANDGAP METHOD AND APPARATUS

CROSS-REFERENCES TO RELATED APPLICATIONS

This application is a continuation-in-part of commonly-assigned U.S. patent application Ser. No. 12/715, 241 filed Mar. 1, 2010 now U.S. Pat. No. 8,217,382, entitled "Optical-Powered Flexible Photonic Bandgap Sensor Device", which is a continuation-in-part of commonly-assigned U.S. patent application Ser. No. 12/464,769, filed May 12, 2009 now abandoned, entitled "Flexible Photonic Bandgap Sensor Device," the entire content of both applications being fully incorporated by reference herein.

FEDERALLY SPONSORED RESEARCH AND DEVELOPMENT

The Graphene-Based Conductive, Lossless Photonic Bandgap Method and Apparatus is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 101712.

BACKGROUND

The use of silicon has long been established for infrared optics, such as simple lenses and windows and long-wave detection. An advantage of silicon photonics is its electronic properties, adding the potential of optoelectronic and electro-optic interactions of photons and electrons. This makes possible electrical excitation and manipulation of light as well as optical conversion to electrical signals and even light control of light.

Silicon doping is required to provide conductivity and the ability to electro-optically control light propagation within photonic structures. Unfortunately, the doping of silicon is also associated with a high level of insertion loss. For instance, the insertion loss for undoped silicon is 3-4 dB/cm, while the insertion loss for Boron doped silicon is on the order of 10-15 dB/cm.

Graphene is a material which is conductive and lossless at optical frequencies, so it removes the need for Si doping. The disadvantage of graphene lies in the difficultly of placing the material onto regions of interest and in the desired orientation, as graphene sheets are only one atomic layer thick and expensive to obtain. Accordingly, there is a need for a conductive, lossless photonic bandgap method and apparatus for use with photonic structures.

DETAILED DESCRIPTION OF SOME EMBODIMENTS

The embodiments of the method and apparatus discussed herein provide a conductive, lossless photonic bandgap method and apparatus for use with photonic structures, through the use of graphene. Utilization of the properties of graphene removes the need for silicon doping, enabling conductive and lossless silicon structures at optical frequencies, specifically a photonic bandgap (PBG) structure with oriented graphene.

As noted above, the disadvantage of graphene lies in the difficultly of placing the material onto regions of interest and in the desired orientation, as graphene sheets are only one atomic layer thick and expensive to obtain. The embodiments of the method and apparatus discussed herein overcome this difficulty by providing an improved method for coating the silicon structures with graphene, since graphene does not normally adhere to silicon.

Specifically, the embodiments discussed herein provide a method for orienting graphene statically or dynamically, either parallel to the substrate, perpendicular to the substrate, or with any desired distribution of orientations with respect to the substrate. Further, in some embodiments, the orientation of graphene flakes adhered to a photonic crystal element is controlled by the spin speed during the graphene production process. Spin-on graphene allows for the control of an electro-optic material (such as liquid crystals), which allows for the fabrication of an on-chip transistor or filter within the photonic bandgap layer.

Additionally, the embodiments discussed herein remove the need for large, bulky electrodes placed in multiple areas of the sample for electro-optic control of silicon photonic structures. Using the embodiments of the method discussed herein, the electrodes/contacts on the sample can be placed anywhere, allowing for small wire bonds to connect to the large probe contact areas.

Figure 1A:
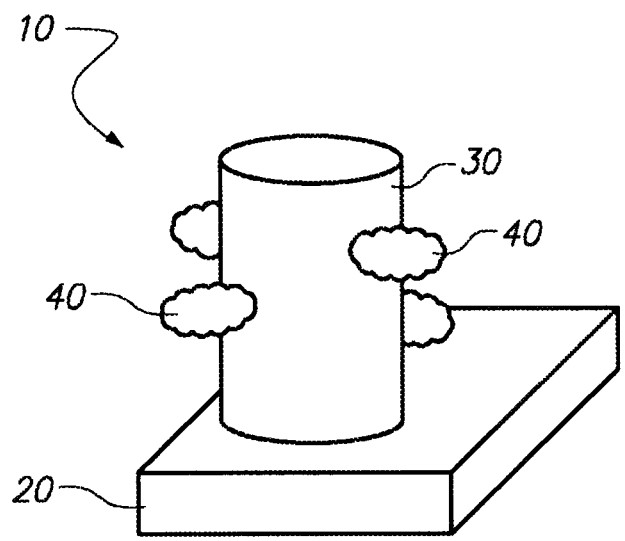
FIGS. 1A and 1B show perspective views of an embodiment of a system including a single, undoped photonic crystal element having graphene thereon, coupled to a substrate, in accordance with the Graphene-Based Conductive, Lossless Photonic Bandgap Method and Apparatus.
Figure 1B:
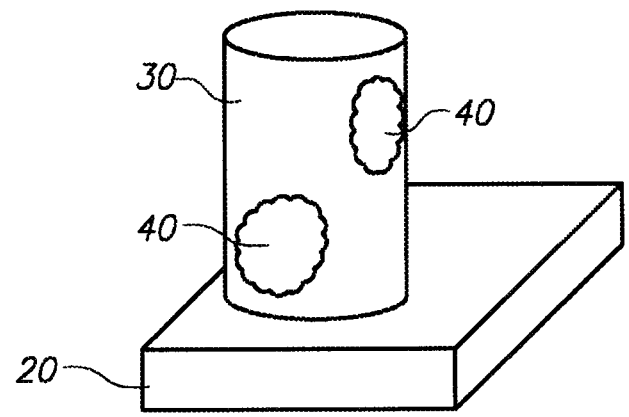

FIGS. 1A and 1B show perspective views of an embodiment of a system 10 in accordance with the Graphene-Based Conductive, Lossless Photonic Bandgap Method and Apparatus. System 10 includes a substrate 20 and a three-dimensional photonic crystal element 30 directly coupled thereto. In some embodiments, substrate 20 comprises undoped silicon. In some embodiments, photonic crystal element 30 comprises undoped silicon. As an example, three-dimensional photonic crystal element 30 may be configured similarly to that described in U.S. Pat. No. 7,194,175, to Rodgers et al., the content of which if fully incorporated by reference herein.

Photonic crystal element 30 is at least partially coated with graphene 40. In some embodiments, enough graphene 40 is coated on photonic crystal element 30 to allow for a low threshold field to drive, for example, a current of $10^{-8}$ A/cm$^2$. In some embodiments, photonic crystal element 30 is coated with enough graphene to drive a desired current amount for a particular application. In some embodiments, photonic crystal element 30 is substantially coated with graphene 40, meaning that more surface area than not of photonic crystal element 30 is coated with graphene 40.

As an example, photonic crystal element 30 may be substantially coated by graphene 40 using a spin-on coating process. Using such a process, graphene 40 will cover the top and most of the sides of the photonic crystal element 30, but may not completely cover all of photonic crystal element 30. A method 300 for preparing graphene for such a spin-on coating process is described in more detail herein with regard to FIG. 4.

In some embodiments, such as shown in FIG. 1A, graphene 40 is oriented in a direction normal to photonic crystal element 30. In some embodiments, such as shown in FIG. 1B, graphene 40 is oriented in a direction parallel to photonic crystal element 30. In some embodiments, graphene 40 may have other orientations with respect to substrate 20 and/or photonic crystal 30 as necessary for the particular application. Applications for system 10 include, but are not limited to, use in solar cells, optical sensors, or optical modulators.

For example, when integrating a nematic liquid crystal into photonic crystal element 30 so that polarization properties of light may be manipulated or detected, the orientation of graphene 40 may be used to align the homeotropic molecules in a preferred direction. Thus, differentiation of light of different polarizations may be detected or selected. Alternately, since the conductivity of graphene is highly anisotropic, the orientation of graphene 40 may be used to selectively increase the sensitivity of a sensor in a preferred orientation. This may allow automatically filtering of unwanted signals that do not exhibit the preferred orientation.

The orientation of graphene 40 determines the direction along which conductivity occurs. For example, in system 100 shown in FIG. 2, graphene 40 oriented in a direction normal to photonic crystal element 30, as shown in FIG. 1A, will cause conductivity to occur along the direction between the photonic crystal elements 120.

In some embodiments, graphene 40 comprises graphene flakes, as shown. In some embodiments, the graphene flakes may be incorporated into a composite thin film. Such incorporation may occur by a method such as method 300 discussed herein. As an example, the composite thin film may comprise graphite oxide and linear monodisperse polystyrene.

Figure 2:
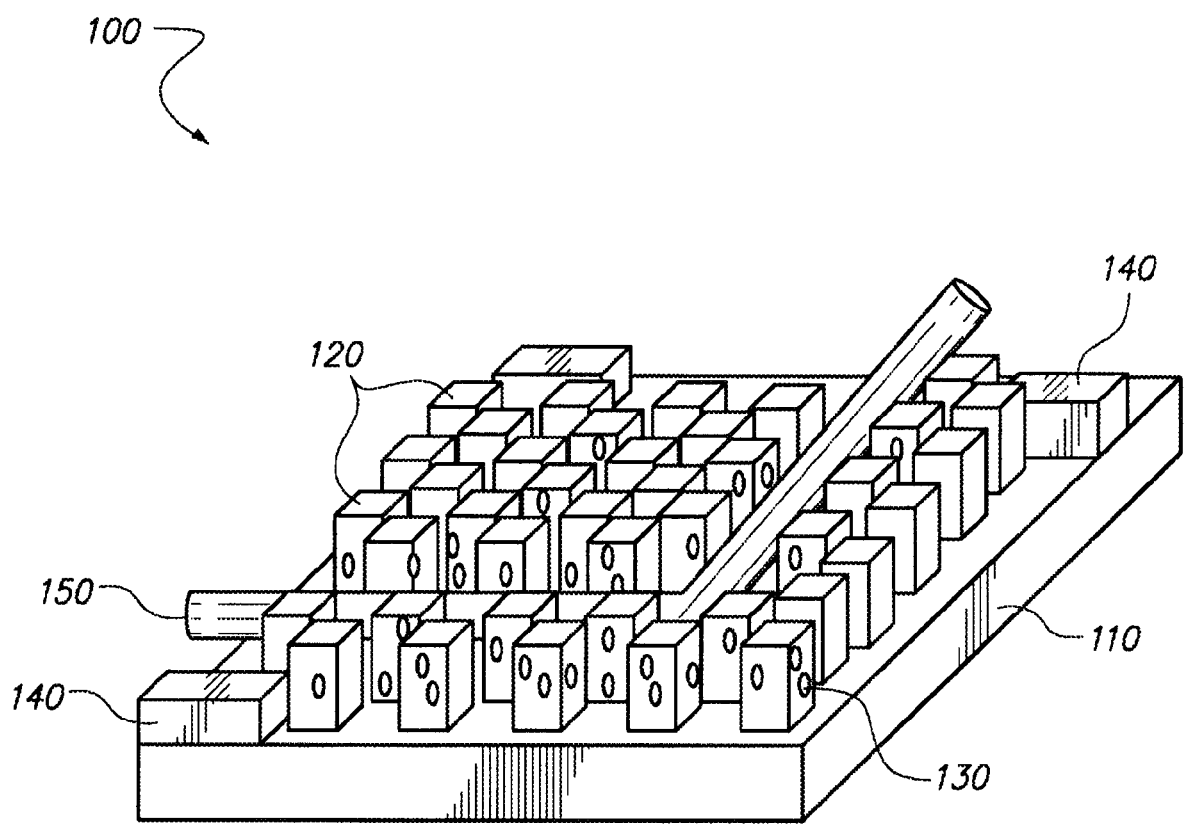
FIG. 2 shows a perspective view of an embodiment of a graphene coated, undoped photonic bandgap structure configured as an electro-optically tunable optical filter, in accordance with the Graphene-Based Conductive, Lossless Photonic Bandgap Method and Apparatus.

FIG. 2 shows a perspective view of an embodiment of a system 100 configured as an electro-optically tunable optical filter, in accordance with the Graphene-Based Conductive, Lossless Photonic Bandgap Method and Apparatus. System 100 includes a substrate 110 having a plurality of three-dimensional photonic crystal elements 120 directly coupled thereto. Photonic crystal elements 120 may be configured similarly to photonic crystal elements 30 shown in FIG. 1. Each of the three-dimensional photonic crystal elements 120 are at least partially coated with graphene 130. System 100 further includes several metal contacts 140 coupled to substrate 110. Contacts 140 may be used establish a potential difference to dynamically tune the properties of an electro-optic material, such as liquid crystals, present in the region between photonic crystal elements. As shown, the plurality of three-dimensional photonic crystal elements 120 are arranged to create a waveguide region such that an optical input 150 can pass therethrough.

In some embodiments, at least one photonic component is contained between the plurality of three-dimensional photonic crystal elements. As an example, the at least one photonic component is a waveguide, a modulator, or a filter.

Figure 3:
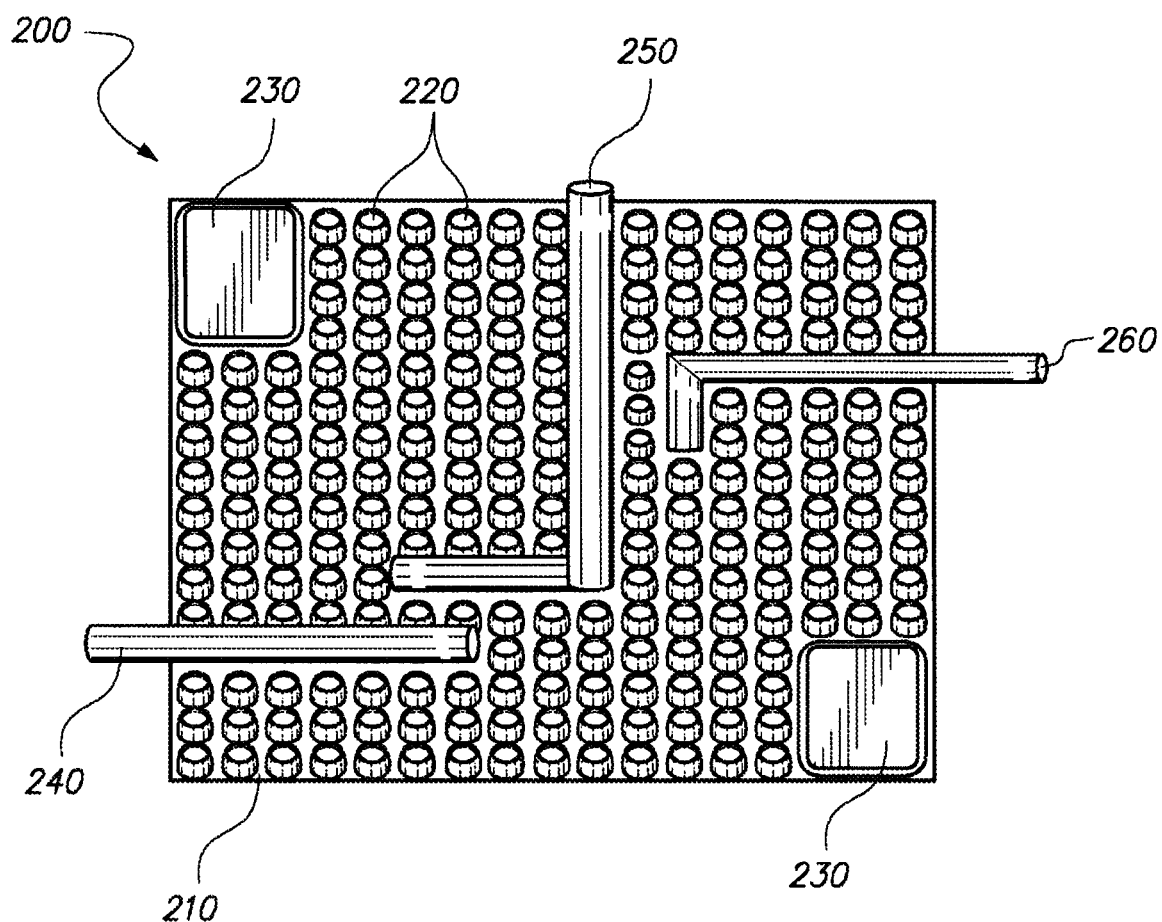
FIG. 3 shows a top view of an embodiment of a graphene coated, undoped photonic bandgap structure configured as an electro-optically tunable optical filter, in accordance with the Graphene-Based Conductive, Lossless Photonic Bandgap Method and Apparatus.

FIG. 3 shows a top view of an embodiment of a graphene coated, undoped photonic band gap (PBG) structure 10 in accordance with the Graphene-Based Conductive, Lossless Photonic Bandgap Method and Apparatus. As shown, PBG structure 10 is configured as an electro-optically tunable optical filter.

Figure 4:
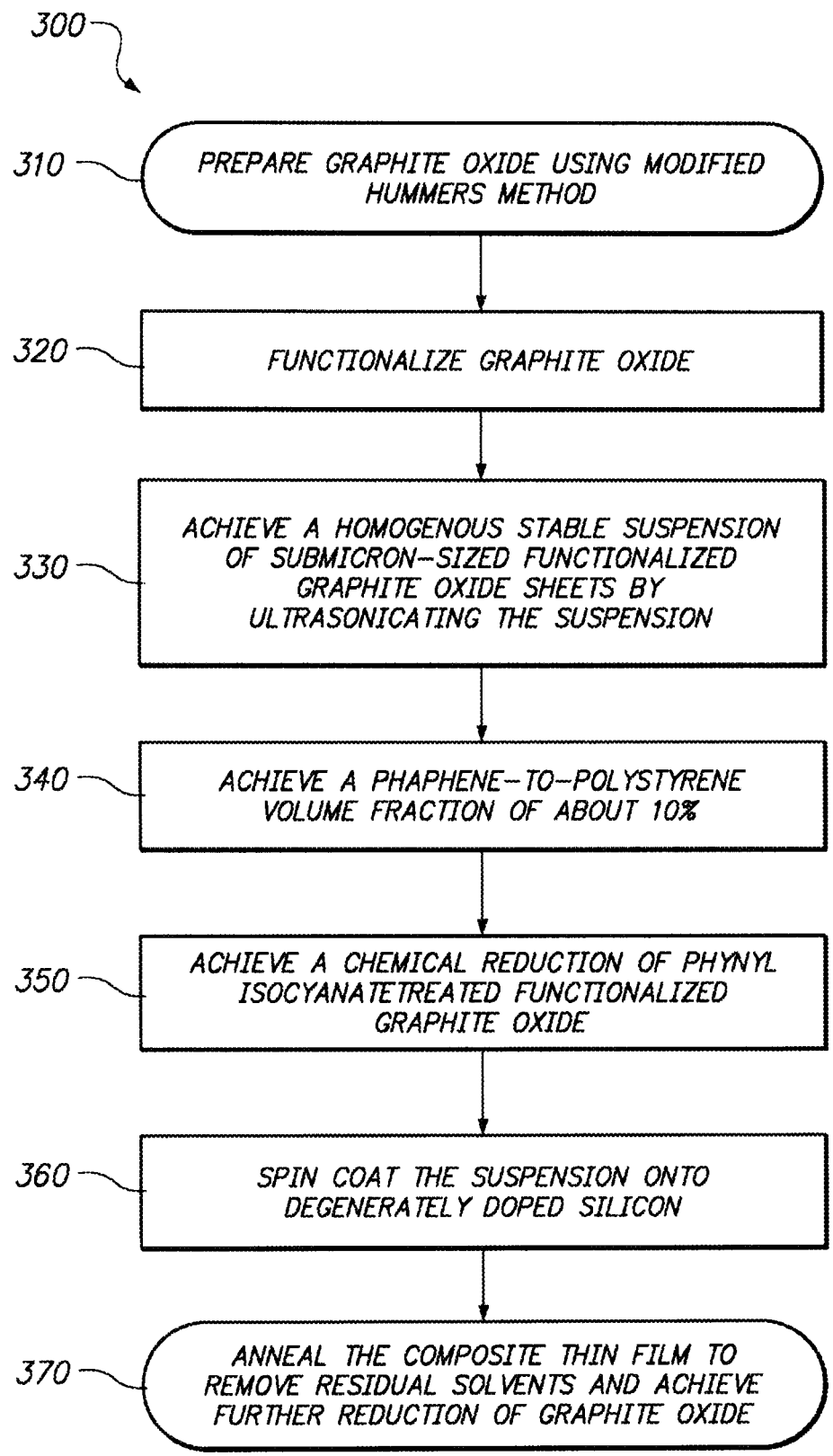
FIG. 4 shows a flowchart of an embodiment of a method for producing graphene for use in accordance with the Graphene-Based Conductive, Lossless Photonic Bandgap Method and Apparatus.

FIG. 4 shows a flowchart of an embodiment of a method 300 for producing graphene for use in accordance with the Graphene-Based Conductive, Lossless Photonic Bandgap Method and Apparatus. Method 300 begins at step 310, which involves preparing the graphite oxide. In some embodiments, the graphite oxide is prepared using a method such as the modified Hummers method, with such method including the following steps:

1. Stir 100 g. of powdered flake graphite (Dixon's #635, 325 mesh; or Sigma-Aldrich) and 50 g. of sodium nitrate into 2.3 liters of 66° Be technical sulfuric acid. Mix the ingredients in a 15 liter battery jar. The ingredients should be cooled to 0° in an ice-bath as a safety measure.
2. While maintaining vigorous agitation, add 300 g. of potassium permanganate to the suspension. The rate of addition should be controlled carefully to prevent the temperature of the suspension from exceeding 20°.
3. Remove the ice bath and bring the suspension temperature to 35°±3° and maintain for 30 minutes. As the reaction progresses, the mixture will thicken with a diminishing in effervescence. At the end of 20 minutes, the mixture will become pasty with evolution of only a small amount of gas. The paste will be brownish grey in color.
4. At the end of 30 minutes, slowly stir in 4.6 liters of water into the paste, causing violent effervescence and an increase in temperature to 98°. The diluted suspension, now brown in color, should be maintained at this temperature for 15 minutes.
5. Further dilute the suspension to approximately 14 liters with warm water and treat with 3% hydrogen peroxide to reduce the residual permanganate and manganese dioxide to colorless soluble manganese sulfate. Upon treatment with the peroxide, the suspension will turn bright yellow.
6. Filter the suspension which will result in a yellow-brown filter cake. The filtering should be conducted while the suspension is still warm to avoid precipitation of the slightly soluble salt of mellitic acid formed as a side reaction.
7. Wash the yellowish-brown filter cake three times with a total of 14 liters of warm water, and disperse the graphitic oxide residue in 32 liters of water to approximately 0.5% solids.
8. Remove the remaining salt impurities by treating with resinous anion and cation exchangers.
9. Obtain the dry form of graphitic oxide by centrifugation followed by dehydration at 40° over phosphorus pentoxide in vacuum dessicator for 1 week.

Next, step 320 involves functionalizing the graphite oxide by phenyl isocyanate and dissolving it in dimethylformamide at a concentration of 1 mg/mL. Step 320 may involve steps including:

1. Load 50 mg of graphite oxide into a 10 mL round bottom flask equipped with a magnetic stir bar. Add anhydrous DMF (5 mL) under nitrogen to create an inhomogeneous suspension. Add organic isocyanate (2 mmol) and allow the mixture to stir under nitrogen for 24 h. (In the case of solid isocyanates, both the isocyanate and graphite oxide should be loaded into the flask prior to adding DMF.)
2. After 24 hours pour the slurry reaction mixture into methylene chloride (50 mL) to coagulate the product.
3. Filter the product and wash with additional methylene chloride (50 mL), and dry under vacuum.

Next, step 330 involves achieving a homogenous stable suspension of submicron sized functionalized graphite oxide (GO) sheets by ultrasonicating the suspension for about 10 hours. Method 300 may then proceed to step 340, which involves making a graphene-to-polystyrene volume fraction of 10%, by dissolving an appropriate amount of linear monodisperse polystyrene $M_w$=2,014,000 g/mol, polydispersity index=1.04, Scientific Polymer Products.

Following step 340, step 350 may involve achieving a chemical reduction of phenyl isocyanatetreated functionalized graphite oxide by adding 0.1 ml of dimethylhydrazine into 5 ml suspension and heating the mixture to about 80° C. for about 24 hours. Next, step 360 involves spin coating the suspension onto degenerately doped silicon (0.002-0.005 Ωcm) in a glovebox. Step 370 then involves annealing the composite thin film at about 200° C. for about 10 hours to remove residual solvents and also to achieve further reduction of the graphite oxide. It should be noted that the orientation of the graphene in the composite thin films can be varied from randomly oriented to laterally oriented by controlling the spin coating speeds.

Many modifications and variations of the Graphene-Based Conductive, Lossless Photonic Bandgap Method and Apparatus are possible in light of the above description. Within the scope of the appended claims, the Graphene-Based Conductive, Lossless Photonic Bandgap Method and Apparatus may be practiced otherwise than as specifically described. The scope of the claims is not limited to the implementations and embodiments disclosed herein, but extends to other implementations and embodiments as may be contemplated by those having ordinary skill in the art.

We claim:

1. A system comprising:
   a substrate having a three-dimensional photonic crystal element directly coupled thereto, the three-dimensional photonic crystal element at least partially coated with oriented graphene flakes.

2. The system of claim 1, wherein the three-dimensional photonic crystal element comprises undoped silicon.

3. The system of claim 1, wherein the substrate comprises undoped silicon.

4. The system of claim 1, wherein the oriented graphene flakes are oriented in a direction normal to the three-dimensional photonic crystal element.

5. The system of claim 1, wherein the oriented graphene flakes are contained within a composite thin film.

6. The system of claim 5, wherein the composite thin film comprises graphite oxide and linear monodisperse polystyrene.

7. The system of claim 1, wherein the three-dimensional photonic crystal element is substantially coated with oriented graphene flakes.

8. A system comprising:
   a substrate having a plurality of three-dimensional photonic crystal elements directly coupled thereto, each of the three-dimensional photonic crystal elements substantially coated with oriented graphene flakes; and
   at least one optical component contained within the plurality of three-dimensional photonic crystal elements.

9. The system of claim 8, wherein each of the three-dimensional photonic crystal elements comprise undoped silicon.

10. The system of claim 8, wherein the substrate comprises undoped silicon.

11. The system of claim 8, wherein the at least one optical component is a waveguide.

12. The system of claim 8 further comprising at least one photonic component contained between the plurality of three-dimensional photonic crystal elements.

13. The system of claim 12, wherein the at least one photonic component is selected from the group of photonic components consisting of a waveguide, a modulator, a sensor, and a filter.

14. The system of claim 8, wherein the oriented graphene flakes are oriented in a direction normal to the respective three-dimensional photonic crystal element.

* * * * *